United States Patent
Lohmann (10) Patent No.: US 7,412,861 B2
(45) Date of Patent: Aug. 19, 2008

(54) DEVICE FOR MONITORING AN AREA OF COVERAGE ON A WORK TOOL

(75) Inventor: Lutz Lohmann, Olching (DE)

(73) Assignee: Leuze Lumiflex GmbH & Co., Ltd., Fürstenfeldbruck (DE)

( * ) Notice: Subject to any disclaimer, the term of this patent is extended or adjusted under 35 U.S.C. 154(b) by 259 days.

(21) Appl. No.: 11/139,974

(22) Filed: May 31, 2005

(65) Prior Publication Data

US 2005/0265596 A1     Dec. 1, 2005

Related U.S. Application Data

(63) Continuation of application No. 11/020,012, filed on Dec. 23, 2004, now abandoned.

(30) Foreign Application Priority Data

Dec. 23, 2003   (DE)   ................................. 103 60 789

(51) Int. Cl.
*G01D 21/04* (2006.01)
*F16D 13/14* (2006.01)
*B21D 55/00* (2006.01)

(52) U.S. Cl. ................. 72/31.1; 72/31.11; 72/420; 72/421; 72/389.6; 72/702; 192/129 A; 192/130; 250/221

(58) Field of Classification Search ................. 72/19.4, 72/21.1, 21.2, 31.01, 31.1, 31.11, 37, 420, 72/421, 389.4, 389.6, 702; 250/221, 222.1; 192/129 A, 129 R, 130, 134, 133
See application file for complete search history.

(56) References Cited

U.S. PATENT DOCUMENTS

| | | | | |
|---|---|---|---|---|
| 4,660,703 A | * | 4/1987 | Filcich et al. ............... | 192/130 |
| 5,198,661 A | * | 3/1993 | Anderson et al. ........... | 250/221 |
| 6,047,634 A | * | 4/2000 | Futsuhara et al. ........... | 192/134 |
| 6,660,993 B2 | * | 12/2003 | Appleyard et al. .......... | 250/221 |
| 6,752,253 B2 | * | 6/2004 | Fiessler .................. | 192/129 A |
| 6,778,092 B2 | * | 8/2004 | Braune .................... | 250/222.1 |
| 6,903,327 B1 | * | 6/2005 | Appleyard ................. | 250/221 |
| 6,919,555 B2 | * | 7/2005 | Fiessler ...................... | 250/221 |
| 7,080,534 B2 | * | 7/2006 | Schneiderheinze .......... | 192/130 |

(Continued)

FOREIGN PATENT DOCUMENTS

DE    195 44 632 A1    6/1997

(Continued)

*Primary Examiner*—David B Jones
(74) *Attorney, Agent, or Firm*—Venable LLP; Robert Kinberg (57) ABSTRACT

A device for monitoring an area of coverage on a work tool may comprise a lighting unit, a camera, and an evaluation unit. The lighting unit may be adapted to emit light rays for illuminating the area of coverage. The camera may be adapted to detect two-dimensional images of the area of coverage, and the camera may comprise receiving elements arranged linearly. The evaluation unit may be coupled to the camera to evaluate the output signals of the receiving elements to determine a distance value for each receiving element based on the light rays emitted by the lighting device and reflected back from the area of coverage. The evaluation unit may have at least one switching output coupled to the work tool to activate the work tool such that the work tool is operational only if no object is located in the area of coverage.

27 Claims, 5 Drawing Sheets

U.S. PATENT DOCUMENTS

| | | |
|---|---|---|
| 7,176,440 B2 * | 2/2007 | Cofer et al. .................. 250/221 |
| 7,176,444 B2 * | 2/2007 | Bergbach .................... 250/221 |
| 2001/0041077 A1 | 11/2001 | Lehner et al. |
| 2004/0070751 A1 | 4/2004 | Bergbach et al. |

FOREIGN PATENT DOCUMENTS

| | | |
|---|---|---|
| DE | 195 11 990 C2 | 9/1997 |
| DE | 197 17 299 A1 | 2/1998 |
| DE | 196 45 175 A1 | 5/1998 |
| DE | 197 57 595 A | 7/1999 |
| DE | 198 21 974 A1 | 11/1999 |
| DE | 198 33 207 A1 | 2/2000 |
| DE | 100 00 287 A1 | 7/2001 |
| DE | 100 26 305 A1 | 11/2001 |
| EP | 0 875 771 A2 | 11/1998 |
| EP | 1 065 522 A | 1/2001 |
| EP | 1 089 030 A | 4/2001 |
| EP | 1 148 352 A2 | 10/2001 |
| EP | 1 148 353 A2 | 10/2001 |
| EP | 1 168 269 A2 | 1/2002 |
| GB | 2 207 999 A | 2/1989 |
| JP | 08 191501 A | 7/1996 |

* cited by examiner

DEVICE FOR MONITORING AN AREA OF COVERAGE ON A WORK TOOL

CROSS-REFERENCE TO RELATED APPLICATIONS

This application is a continuation of U.S. patent application Ser. No. 11/020,012, filed Dec. 23, 2004, now abandoned which claims the priority of German Patent Application No. 103 60 789.7-52, filed Dec. 23, 2003, the disclosures of both of which are incorporated herein by reference.

BACKGROUND OF THE INVENTION

The invention relates to a device for monitoring an area of coverage on a work tool.

Work tools of this type generally are systems such as machines, plants or vehicles, and their operating movements can endanger persons within a danger zone. A device as mentioned in the above is used to secure such a danger zone by preventing objects from entering an area of coverage that provides the highest possible coverage for the respective danger zone. In particular, devices of this type are used for securing machines such as bending or folding presses, cutting machines, or punching machines. These machines comprise a first machine part which carries out operating movements in the direction of a second machine part. The first machine part of a bending press is an upper tool which can be moved in a perpendicular direction toward a lower tool forming the second machine part for carrying out a bending operation.

To prevent any danger to persons, the area in front of the upper tool or, in general, the area in front of the first machine part must be monitored, such that the machine is stopped immediately if a person enters the danger zone of the machine.

German reference DE 197 172 99 A1 discloses a protective device for monitoring such a danger zone. This protective device comprises an optical sensor arrangement, formed by a light curtain or a light curtain arrangement, which is moved along with the first machine part. The light curtain, or each light curtain, comprises a transmitter for emitting light rays and an associated receiver, wherein these are installed on opposite edges of the first machine part. The light rays emitted by the (or each) transmitter extend parallel to a lower edge of the first machine part, which extends along a straight line, and impinge on the associated receiver if the protective zone is clear. An object entering the protective zone will interrupt the beam path of at least one light barrier, whereupon the operating movement performed by the first machine part is also interrupted.

To ensure that the protective zone monitored with the light barrier or the light barrier arrangement provides the highest possible coverage of the danger zone, a receiving signal is needed which shows that the transmitting light rays for the (or each) light barrier extend at a specified, safe distance along the lower edge of the first machine part. To adjust this safety distance, an additional light barrier is provided for which the transmitting light rays extend at the level of the lower edge of the first machine part. The optical sensor arrangement on the first machine part is moved for this adjustment operation until a beam interruption is recorded for the light barrier to be adjusted. Following this, the sensor arrangement is moved slightly in the opposite direction until the interruption of the light barrier beam is just canceled.

This protective device has the disadvantage that a danger zone can only be monitored in points along the beam axes of the transmitting light beams for the light barriers. This is a problem, in particular, if small object sizes must also be detected, e.g., a finger on a hand or the like, to ensure adequate protection of persons. A further disadvantage is that the light barriers must be adjusted to be at a safe distance relative to the first machine part for monitoring the chosen danger zone, an operation that is involved and time-consuming.

Finally, it is a disadvantage that these protective devices cannot be used at all or only to a limited degree on machines designed as bending or folding presses. These machines are used to produce three-dimensional work pieces, meaning that following the bending operation, one side of such a work piece can block the beam path of the light barriers, thus no longer allowing the detection of objects.

SUMMARY OF THE INVENTION

It is the goal of the present invention to create a system that allows a secure monitoring of the danger zones on working means, and which covers these danger zones as completely as possible.

This and other objects may be achieved using an inventive device for monitoring an area of coverage on a work tool, comprising: a lighting unit to emit light rays for illuminating the area of coverage; a camera to detect two-dimensional images of the area of coverage, the camera comprising receiving elements arranged linearly; and an evaluation unit coupled to the camera to evaluate the output signals of the receiving elements to determine a distance value for each receiving element based on the light rays emitted by the lighting device and reflected back from the area of coverage, said evaluation unit having at least one switching output coupled to the work tool to activate the work tool such that the work tool is operational only if no object is located in the area of coverage.

One essential advantage of the device according to the invention is that by using the camera and evaluating the output signals from the receiving elements, it is not only possible to check for the presence of objects, but also to obtain depth information as a result of the distance measurements carried out. A two-dimensional image of objects within the area of coverage is obtained in this way. It is particularly advantageous that an object can be detected within the area of coverage without necessitating a reference image comparison. In particular, it is also possible to securely detect objects before a background, wherein the object detection is largely independent of environmental influences such as the structure of the background or external light irradiation.

The device according to the invention can be used, in particular, for monitoring danger zones on machines where a first machine part executes operating movements toward a second machine part. Machines of this type, in particular, can be designed as cutting or punching machines and can furthermore be embodied as bending and folding presses, wherein the first machine part is an upper tool which can be displaced relative to a stationary lower tool that forms the second machine part. It is advantageous that when the device according to the invention is installed in the region of the first machine part, the upper tool in the case of a bending press, the complete danger zone up to the lower tool can be monitored. It is particularly advantageous that movements of the work pieces to be processed do not result in blocking the beam path for the device according to the invention. Thus, object detection by means of the device is ensured within the area of coverage, even when guiding work pieces in the danger zone.

To protect persons and objects, the work tool operation is stopped with the device according to the invention if an object intervention is recorded in the area of coverage. In the simplest case, the work tool is deactivated anytime an object enters the area of coverage.

According to one advantageous embodiment of the invention, a distinction is made between safety-critical objects and non safety-critical objects. Non safety-critical objects, for example, can be work pieces to be processed, machine parts, stationary building parts and the like. Non safety-critical objects of this type generally do not result in danger to persons. A deactivation of the work tool resulting from the detection of a non safety-critical object of this type would consequently lead to unnecessary down time and thus a reduction in the availability of the work tool.

Data relating to the contours and, if necessary, also the paths of non safety-critical objects of this type are advantageously acquired in a learning process. During the operating phase following this learning process, all objects not corresponding to the acquired, non safety-critical objects are then classified as safety-critical objects, so that their detection within the area of coverage leads to a deactivation of the work tool. This ensures a maximum degree of safety for monitoring the area of coverage because only the previously acquired non safety-critical objects do not result in a deactivation of the work tool when they enter the area of coverage.

In general, the work tool can be deactivated via the device according to the invention if an object, especially a safety-critical object, is detected within the total area of coverage.

Alternatively, protective zones and non safety-critical regions can also be defined within the area of coverage, wherein only objects detected in the non safety-critical regions do not result in deactivating the work tool. By screening regions in this way, the availability of the work tool is increased because unnecessary idle times resulting from shut-down commands due to object detections in these regions are avoided.

The device according to the invention is used, in particular, for the protection of persons. To meet the required safety level, the sensor unit of the device is advantageously designed to be self-monitoring in that an automatic error control is executed in the sensor unit, wherein the sensor unit advantageously has a single-channel design. In contrast, the evaluation unit installed downstream of the sensor unit preferably has a two-channel design.

BRIEF DESCRIPTION OF THE DRAWINGS

The invention is explained in the following with the aid of the drawings, in which:

FIGS. 4a-4c show a device according to FIGS. 1 and 2, arranged on a bending press, wherein

DETAILED DESCRIPTION OF AN EMBODIMENT

Figure 1:
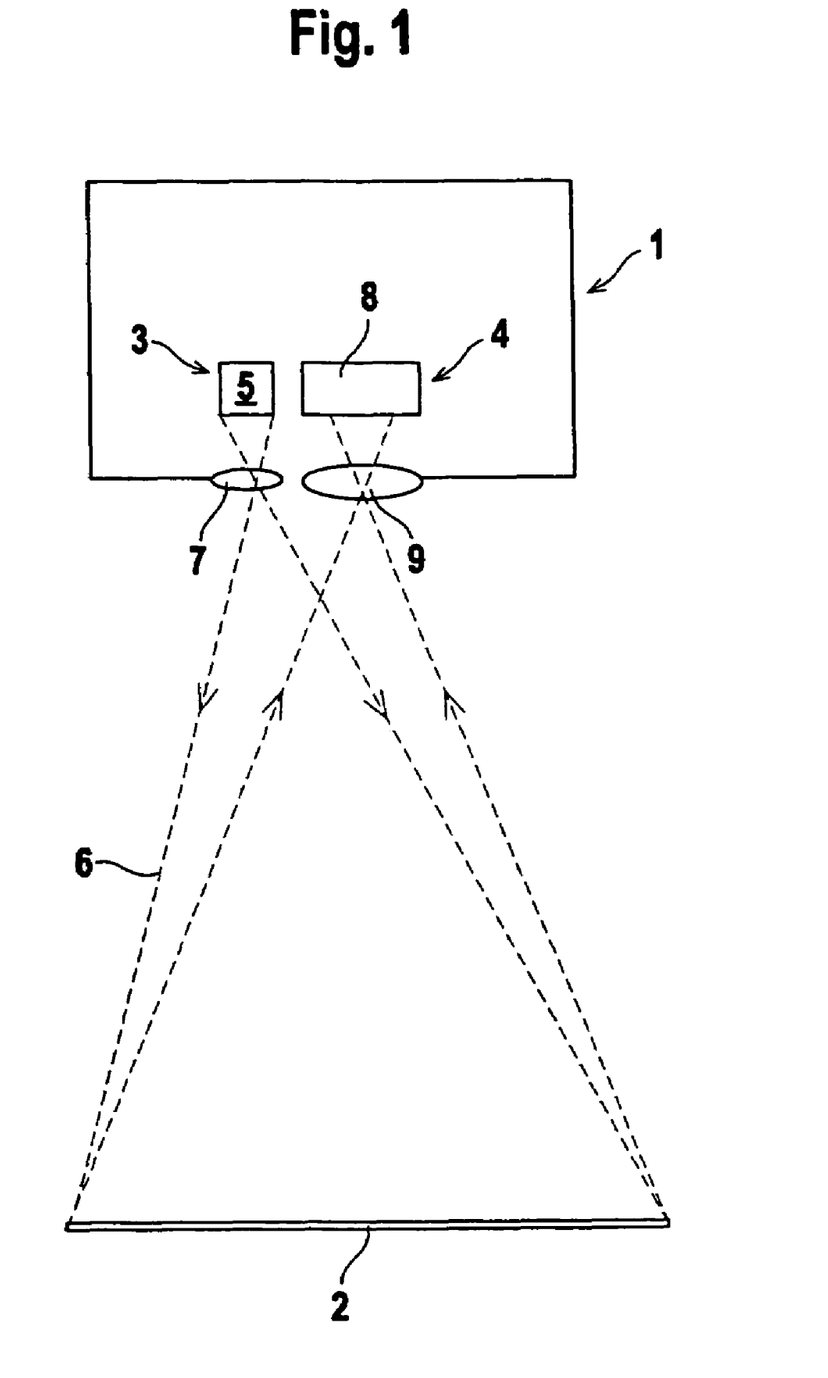
FIG. 1 shows a schematic representation of the optical components of a device for detecting objects according to an embodiment of the invention.

FIG. 1 schematically shows the optical components of a device 1 for monitoring an area of coverage 2 on a work tool which is not shown in FIG. 1, and which is a machine, a system, or the like, according to an embodiment of the invention. A danger zone is created in the region of the work tool as a result of operating movements carried out by the work tool. This danger zone within the area of coverage 2 is monitored by the device 1.

The optical components of the device 1 form a sensor unit, comprising a lighting unit 3 and a camera 4. For the present case, the lighting unit 3 is provided with a transmitter 5 in the form of a laser diode which emits light rays 6. Alternatively, the transmitter 5 can also be a light-emitting diode. The lighting unit 3 can furthermore also comprise arrangements of several laser diodes or light-emitting diodes. A further component of the lighting unit 3 is transmitting optics 7, installed downstream of the transmitter 5. The transmitting optics 7 are designed for the beam formation of the light rays 6, such that the light rays 6 completely illuminate the area of coverage 2 to be monitored.

The camera 4 is provided with a linear arrangement of receiving elements. For the present case, the camera 4 has a CMOS chip 8 with a linear arrangement of receiving elements. Alternatively, the camera 4 can be provided with a corresponding CCD chip.

The camera 4 is furthermore provided with receiving optics 9, installed upstream of the CMOS chip 8. With the aid of the receiving optics 9, the light rays 6 that are reflected back from the area of coverage 2 are focused onto the receiving elements of the CMOS chip 8.

Figure 2:
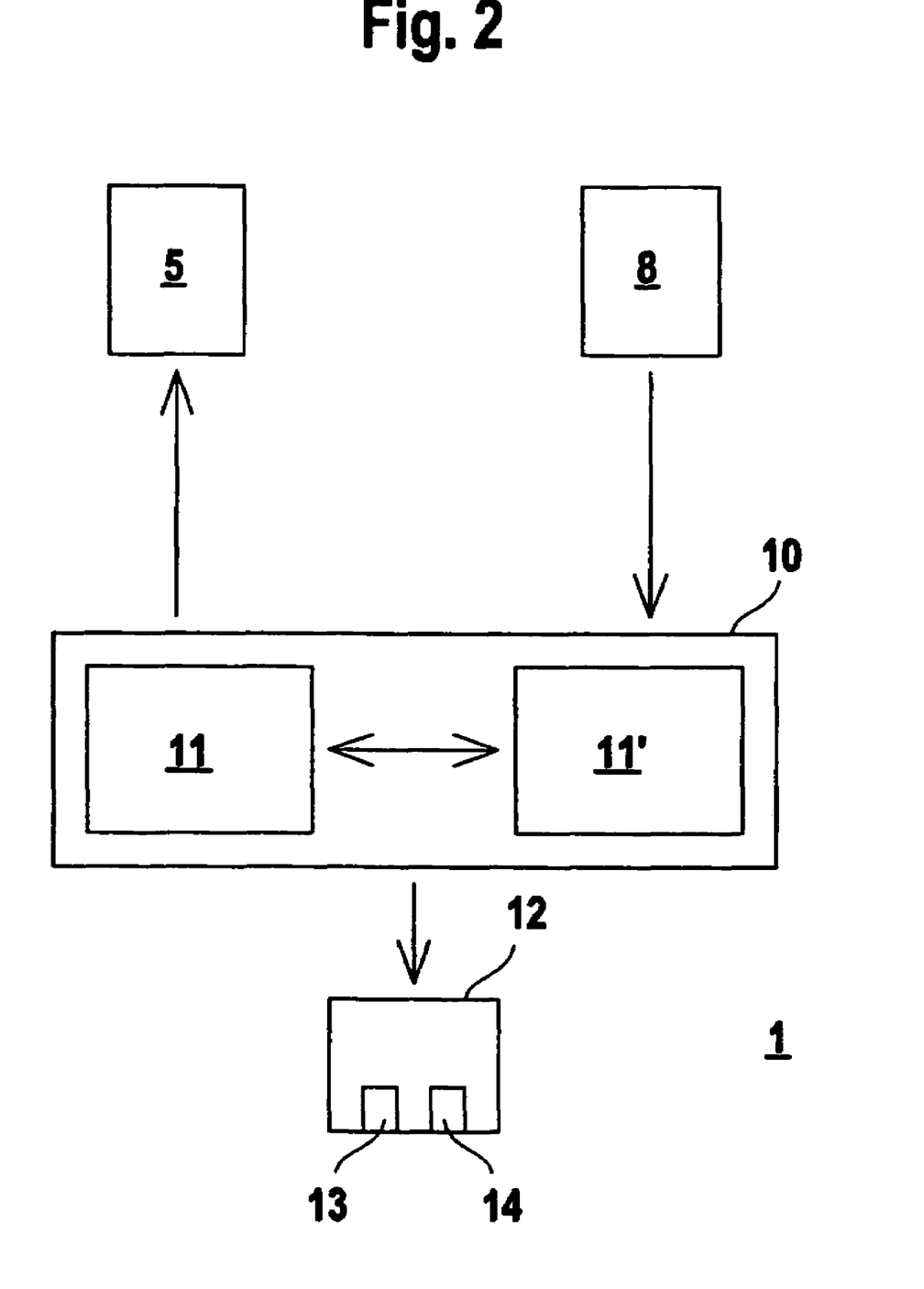
FIG. 2 shows a block wiring diagram of the device according to FIG. 1.

FIG. 2 shows a block wiring diagram of the device 1 according to FIG. 1. The transmitter 5 of the lighting unit 3 and the camera 4 are connected to a two-channel evaluation unit 10, formed in the present case with two identical computer units 11, 11' that monitor each other.

On the one hand, the evaluation unit 10 is used to activate the lighting unit 3 while, on the other hand, the output signals from the receiving elements in the camera 4 are evaluated in the evaluation unit 10. To detect two-dimensional images of the area of coverage 2 or of objects positioned in the area of coverage 2, distance values are continuously determined based on the travel time for the light rays 6 emitted by the lighting unit 3 and reflected back from the area of coverage 2.

An output circuit 12 with a switching output 13 and a warning output 14 is connected to the evaluation unit 10.

A binary switching signal is generated in the evaluation unit 10 in dependence on the evaluation of the output signals from the receiving elements and is emitted via the switching output 13, wherein this signal activates or deactivates the work tool. Upon detection of an object intervention in the area of coverage 2, a switching signal state is generated which results in the work tool being deactivated, i.e., the work tool is shut down. A warning signal, which can be emitted via the warning output 14, is furthermore generated in the evaluation unit 10, if necessary.

According to a first variant, the sensor unit measures the distance based on a phase-measuring technique for which an amplitude modulation with a predetermined modulation frequency is imprinted onto the light rays 6 emitted by the transmitter 5. To increase the unambiguous range for the phase measuring and thus the detectable distance range, several amplitude modulations with different modulation frequencies can also be imprinted onto the light rays 6. The phase-measuring technique is used to determine, for each receiving element of the CMOS chip 8, the phase difference between the light rays 6 emitted by the transmitter 5 and the light rays 6 that are reflected back from the area of coverage 2 and onto the receiving elements. The evaluation unit 10 then computes the respective distance values from the resulting phase differences, and the two-dimensional images of objects located in the monitoring area are obtained based on the totality of all distance values determined for the receiving elements.

According to a second variant, the distance is measured with the sensor unit on the basis of a pulse transit-time method, wherein the transmitter 5 emits light rays 6 in the form of light pulses. For the distance measuring, the travel time of each light pulse from the transmitter 5 to the area of coverage 2 and back to the camera 4 is evaluated for each receiving element. As before, two-dimensional images of objects within the area of coverage 2 are then obtained from the totality of all distance values for the individual receiving elements.

Figure 3A:
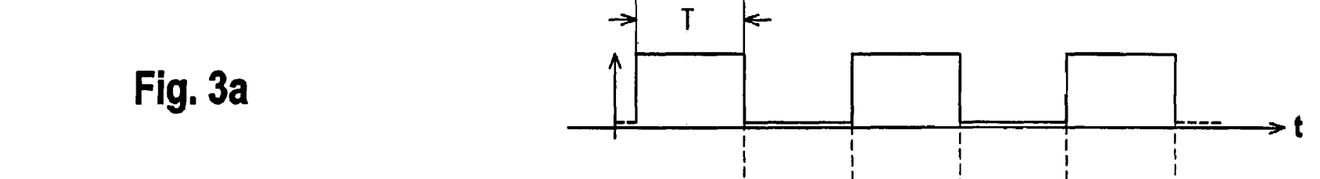
FIGS. 3a-3d show time-dependency diagrams for determining the distance based on a pulse transit-time method for the device shown in FIG. 1.
Figure 3B:
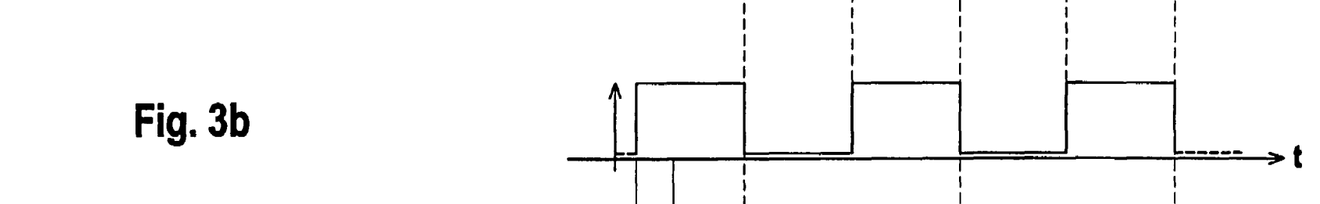
Figure 3C:
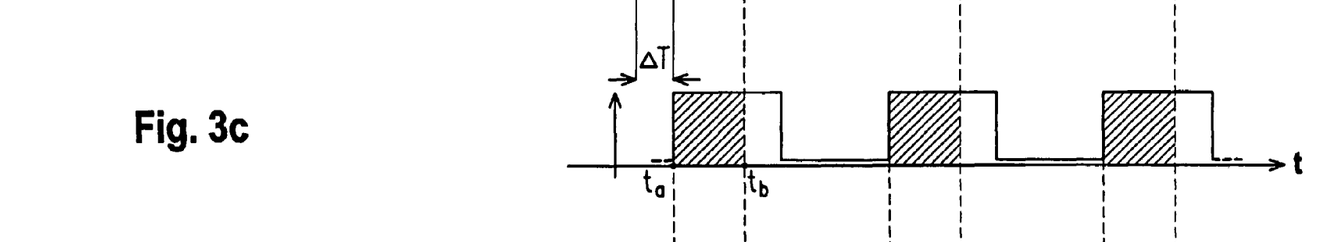

FIGS. 3a-3d schematically show the principle of measuring the distance with a pulse-transit time method. The FIG. 3a shows the sequence of light pulses, emitted by the transmitter 5, which are referred to as transmitting light pulses in FIG. 3a. The transmitting light pulses respectively have the same pulse duration T. The pulse intervals between two transmitting light pulses are also constant. The pulses shown in FIG. 3c are referred to as receiving light pulses in FIG. 3c. These pulses are emitted by the transmitter 5 and are reflected back onto a receiving element by an object located at distance d from the device 1. Corresponding to the travel time of a light pulse from the transmitter 5 to the object and back to the receiving element, each receiving light pulse is delayed relative to the associated transmitting light pulse by the time interval $\Delta T=2d/c$, wherein d represents the distance between the object and the device 1 and c represents the speed of light. For the distance determination, the time interval $\Delta T$ can essentially be determined with a counting method. For this, an oscillator-controlled counter is started when a transmitting light pulse is emitted, preferably during its rising edge. The counter is stopped once the associated receiving light pulse is received, preferably during its rising edge.

For the present case, the time interval $\Delta T$ is determined by means of an integration method. FIG. 3b shows integration interval sequences for integrating the output signal that is generated at the receiving element by the receiving light pulse. FIGS. 3a-3d show that the individual integration intervals respectively last for the duration of a transmitting light pulse, meaning the output signal on the receiving element is respectively integrated only during the emission of a transmitting light pulse. Since each receiving light pulse is delayed by $\Delta T$, relative to the associated transmitting light pulse, only a portion of the receiving light pulses falls into the respective integration interval. Accordingly, the output signal for the first receiving light pulse, for example, is integrated only during the time interval between $t_a$ and $t_b$.

Figure 3D:
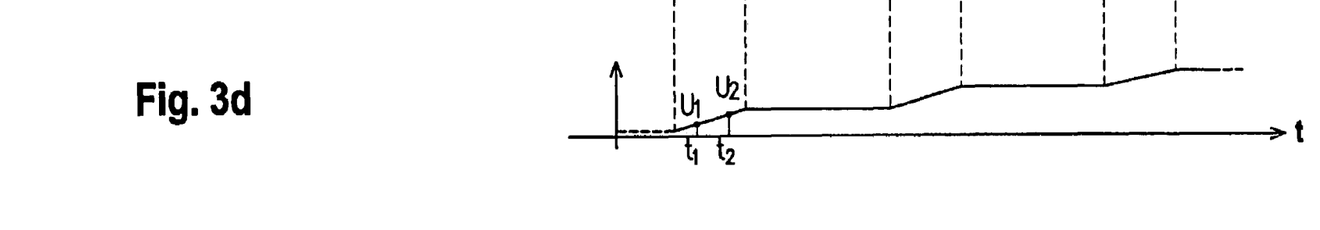

The integrated output signal U, obtained in this way, is shown in FIG. 3d.

Two measuring points for the integrated output signal are selected within each integration interval for determining $\Delta T$, wherein the measuring point position is selected such that these are in a time interval in which the receiving light pulse just arrives at the receiving element.

The measuring points $U_1$, $U_2$ at instants $t_1$, $t_2$ are selected for the first integration interval, and $\Delta T$ is then determined from these measuring points using the following equation:

$$\Delta T=(U_2 t_1-U_1 t_2)/(U_2-U_1)$$

Two-dimensional images of objects are obtained with the aid of the distance measurements realized for the individual receiving elements of the camera 4. In particular, these images can also be used to detect objects in front of background areas with an optional surface structure.

If the device is used for the protection of persons, it must meet the requirements of the corresponding safety level. The evaluation unit 10 thus has a redundant, two-channel design and comprises two computer units 11, 11' that monitor each other.

The sensor unit, in particular the camera 4, has a single-channel design. To achieve the required safety level, an automatic error control is executed in the sensor unit, such that this unit is self-monitoring.

In the event that the device 1 uses a pulse transit-time method for measuring the distance, the emission of a transmitting light pulse is delayed at predetermined time intervals for realizing the automatic error control. The resulting change in the distance measurement for the individual receiving elements is then checked in the evaluation unit 10.

In the same way, if a phase-measuring technique is used for measuring the distance, the phase of the amplitude modulation imprinted on the light rays 6 is displaced, and the resulting change in the distance measurement is checked for the individual receiving elements.

For the object detection with the device 1, a switching signal for deactivating the work tool can usually be generated in the evaluation unit 10 once any object is recorded in the area of coverage 2.

Alternatively, the device 1 makes it possible to differentiate between safety-critical objects and non safety-critical objects, wherein only the penetration of safety-critical objects into the area of coverage 2 leads to a deactivation of the work tool.

Non safety-critical objects of this type can be machine parts, for example, especially parts of work tools; work pieces to be processed with the work tool; or even stationary parts such as building components. In general, a non safety-critical object of this type entering the area of coverage 2 does not result in danger and in particular, results in no danger to persons.

To avoid an unnecessary shutdown of the work tool when a non safety-critical object enters the area of coverage 2, the contours and, if necessary, also the paths of non safety-critical objects, provided the objects always move along those paths, are acquired during a learning process and the data stored in the evaluation unit 10.

Objects detected in the area of coverage 2 during the subsequent operation of the device 1 are then compared in the evaluation unit 10 to the stored, non safety-critical objects and/or their paths, if applicable. If it is determined that the detected object does not coincide with the non safety-critical object, then the detected object is classified as a safety-critical object, and a switching signal is generated for shutting down the work tool.

The device can be installed, in particular, on machines where a first machine part executes working movements in the direction of a second machine part.

Figure 4A:
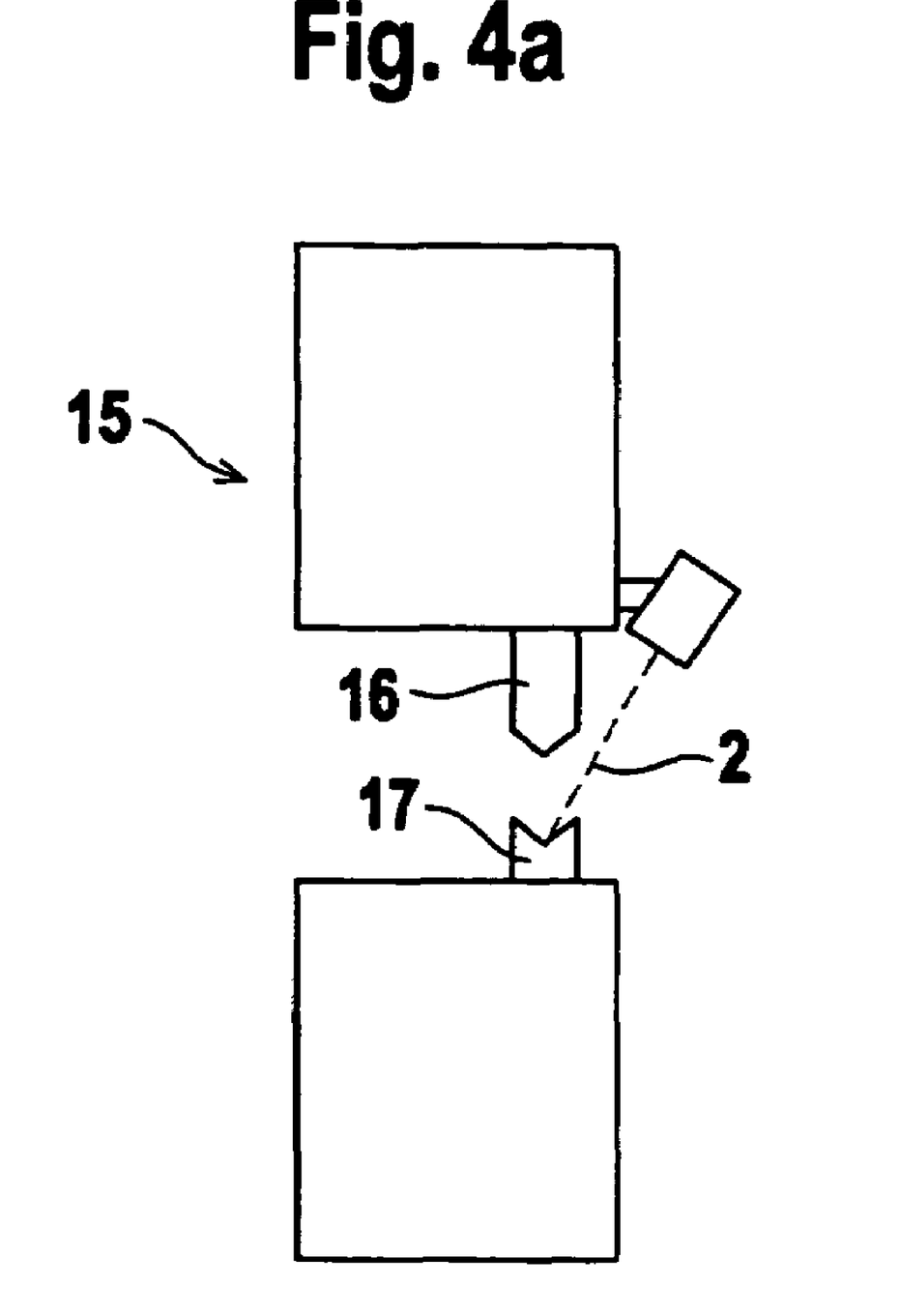
FIG. 4a shows a cross section through the bending press.
Figure 4B:
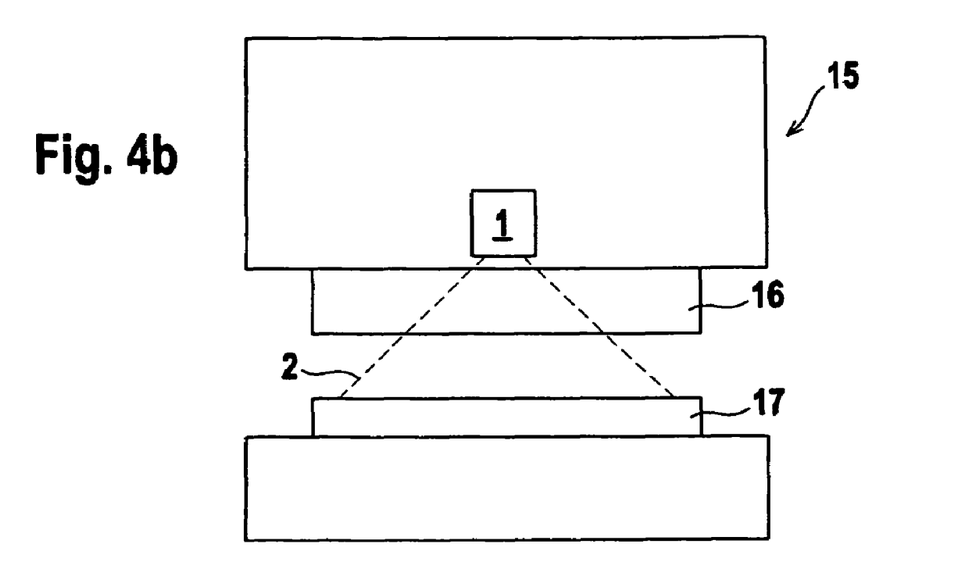
FIG. 4b represents a view from above of the bending press without a work piece to be processed.
Figure 4C:
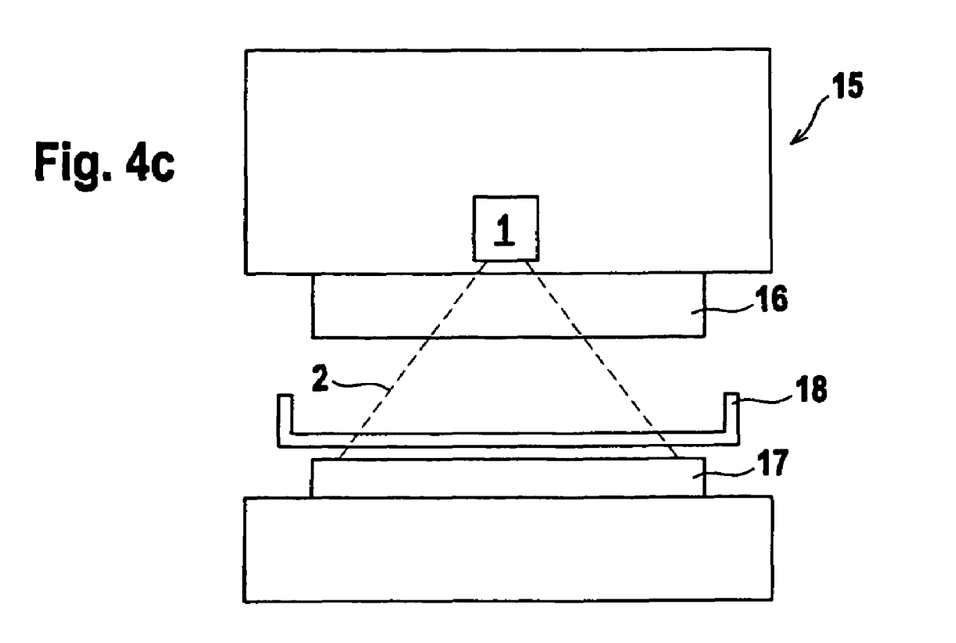
FIG. 4c represents a view from above of the bending press with a work piece to be processed.

FIGS. 4a-c show an exemplary embodiment of a machine in the form of a bending press 15 on which is installed a device according to an embodiment of the invention. The bending press 15 comprises an upper tool 16 as a first machine part that can be moved in a vertical direction toward a second machine part, the lower tool 17, for realizing the bending operations.

The bending press 15 is used to bend work pieces, wherein FIG. 4c shows a work piece in the form of a sheet metal piece 18. The sheet metal piece 18 is folded and/or bent along a bending line by guiding the horizontally extending lower edge of the upper tool 16 toward the also horizontally extending upper edge of the lower tool 17.

To process the work pieces, such work pieces are generally inserted by the operating personnel into predetermined positions between the upper tool 16 and the lower tool 17. The respective operator thus faces the danger of injury as a result of inserting hands or fingers in the region between upper tool 16 and lower tool 17.

The device 1 is installed on the bending press 15 to protect the operating personnel by monitoring the danger zone between the upper tool 16 and the lower tool 17.

The device 1 is installed in the region of the upper tool 16, such that it covers the complete area of coverage 2 up to the top part of the lower tool 17. The device 1 in this case is attached to the frame for the bending press 15 that accommodates the upper tool 16. Alternatively, the device 1 can also be attached to the upper tool 16, such that the device 1 is moved along with the upper tool 16.

FIG. 4b shows that the area of coverage 2 is delimited by the upper edge of the lower tool 17. Since the device 1 forms two-dimensional images of objects in the area of coverage 2 because of the distance measurements realized there, objects in the area of coverage 2 can be safely distinguished from the background formed by the upper edge of the lower tool 17.

FIG. 4c shows the bending press 15 with a sheet metal piece 18 positioned between the upper tool 16 and the lower tool 17, wherein this sheet metal piece has perpendicular wall segments on the sides, created in a preceding bending process, which project upward from a bottom part to be processed. With light barriers for the monitoring arranged on the side of the bending press 15, the horizontally extending transmitting light beams from these light barriers would be blocked by the aforementioned wall segments, thus no longer allowing the monitoring of the danger zone between upper tool 16 and lower tool 17.

The device 1 according to the invention, on the other hand, makes it possible to monitor the danger zone in this case, as well, because the device 1 is arranged in the region of the upper tool 16, such that the field of view for the camera 4 of the device 1 is directed from above toward the lower tool 17.

Because the sheet metal piece 18 that is positioned in the danger zone should not result in a response by the device 1 and cause a shutdown of the bending press 15, a learning process is used to acquire the contour of the sheet metal piece 18 as a non safety-critical object, and advantageously also its course during the bending operation, and the acquired data are stored in the evaluation unit 10.

During the subsequent operation, the device 1 generates a shutdown command for the bending press 15 whenever a safety-critical object is detected, meaning whenever an object is detected that does not coincide with the acquired non safety-critical object and/or its path.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A device for monitoring an area of coverage on a work tool, comprising:
    a lighting unit to emit light rays to illuminate the area of coverage;
    a camera to detect two-dimensional images of the area of coverage, the camera comprising receiving elements arranged linearly; and
    an evaluation unit coupled to the camera to evaluate output signals of each receiving element to determine a distance value based on a pulse transit-time method, the evaluation unit having at least one switching output coupled to the work tool to activate the work tool only if no object is located in the area of coverage.

2. The device according to claim 1, wherein the camera includes at least one of a CCD chip or a CMOS chip having a linear arrangement of receiving elements.

3. The device according to claim 1, wherein the lighting unit comprises:
    at least one transmitter to emit light rays; and
    transmitting optics installed downstream of the transmitter.

4. The device according to claim 3, wherein the transmitter comprises at least one light-emitting diode or laser diode.

5. The device according to claim 1, wherein the lighting unit is adapted to emit light rays in the form of light pulses.

6. The device according to claim 1, wherein a distinction is made between safety-critical objects and non safety-critical objects in the evaluation unit, and wherein the work tool is activated via the evaluation unit, but only if no safety-critical object is located in the area of coverage.

7. The device according to claim 6, wherein non safety-critical objects are acquired in a learning process, and wherein the acquired data are stored in the evaluation unit.

8. The device according to claim 7, wherein contours of non safety-critical objects are acquired during the learning process.

9. The device according to claim 7, wherein path movements of non safety-critical objects are acquired during the learning process.

10. A device for monitoring an area of coverage on a work tool, comprising:
    a lighting unit to emit light rays to illuminate the area of coverage;
    a camera to detect two-dimensional images of the area of coverage, the camera comprising receiving elements arranged linearly; and
    an evaluation unit coupled to the camera to evaluate the output signals of each receiving element to determine a distance value based on a phase-measuring method, the evaluation unit having at least one switching output coupled to the work tool to activate the work tool only if no object is located in the area of coverage.

11. The device according to claim 10, wherein the lighting unit is adapted to emit light rays imprinted with an amplitude modulation having at least one predetermined modulation frequency.

12. The device according to claim 10, wherein a distinction is made between safety-critical objects and non safety-critical objects in the evaluation unit, and wherein the work tool is activated via the evaluation unit only if no safety-critical object is located in the area of coverage.

13. The device according to claim 10, wherein the camera includes at least one of a CCD chip or a CMOS chip.

14. The device according to claim 10, wherein the lighting unit comprises:
    at least one of a light-emitting diode or a laser diode to emit light rays; and
    transmitting optics installed downstream of the light-emitting diode or the laser diode.

15. A device for monitoring an area of coverage, which includes a protective zone and a non safety-critical area, on a work tool, the device comprising:
- a lighting unit to emit light rays to illuminate the area of coverage;
- a camera to detect two-dimensional images of the area of coverage, the camera comprising receiving elements arranged linearly; and
- an evaluation unit coupled to the camera to evaluate the output signals of the receiving elements to determine a distance value for each receiving element based on the emitted light rays and the light rays reflected back from the area of coverage, the evaluation unit having at least one switching output coupled to the work tool to activate the work tool if no object is located in the non safety-critical area, wherein the non safety-critical area is defined in dependence on signals from external sensors.

16. The device according to claim 15, wherein at least a portion of a non safety-critical area forms a warning zone, and wherein the evaluation unit is adapted to generate a warning signal if an object is detected in the warning zone.

17. The device according to claim 15, wherein the non safety-critical area is defined in dependence on positions of safety-critical objects or non safety-critical objects within the area of coverage.

18. A device for monitoring an area of coverage on a work tool, comprising:
- a single-channel sensor unit including:
  - a lighting unit to emit light rays to illuminate the area of coverage;
  - a camera to detect two-dimensional images of the area of coverage, the camera comprising receiving elements arranged linearly, and
  - an automatic error control to provide self-monitoring; and
- an evaluation unit coupled to the camera to evaluate the output signals of the receiving elements to determine a distance value for each receiving element based on the light rays emitted by the lighting unit and reflected back from the area of coverage, the evaluation unit having at least one switching output coupled to the work tool to activate the work tool only if no object is located in the area of coverage.

19. The device according to claim 18, wherein the sensor unit operates on the basis of a pulse transit-time method, in which the light pulses emitted by the transmitter are delayed by predetermined time intervals for the automatic error control, and resulting changed distance values of the receiving elements are evaluated.

20. The device according to claim 18, wherein the sensor unit operates based on a phase-measuring method, in which a phase of an amplitude modulation imprinted on the light rays is displaced for the automatic error control, and resulting changed distance values of the receiving elements are evaluated.

21. The device according to claim 18, wherein the evaluation unit has a two-channel design.

22. The device according to claim 21, wherein the evaluation unit comprises two computer units adapted to mutually monitor each other.

23. The device according to claim 18 forming a combination with the work tool, wherein the work tool is a machine comprising a first machine part and a second machine part, wherein the first machine part is to perform working movements in the direction of the second machine part.

24. The combination according to claim 23, wherein the machine comprises a bending press, the first machine part comprises an upper tool, and the second machine part comprises a stationary lower tool, wherein the upper tool is to be displaced relative to the lower tool.

25. The combination according to claim 24, wherein the area of coverage is delimited by an upper side of the lower tool.

26. The combination according to claim 24, wherein the device is disposed in a stationary fashion on the bending press.

27. The combination according to claim 24, wherein the device is disposed on the upper tool.

* * * * *